Patented May 2, 1933

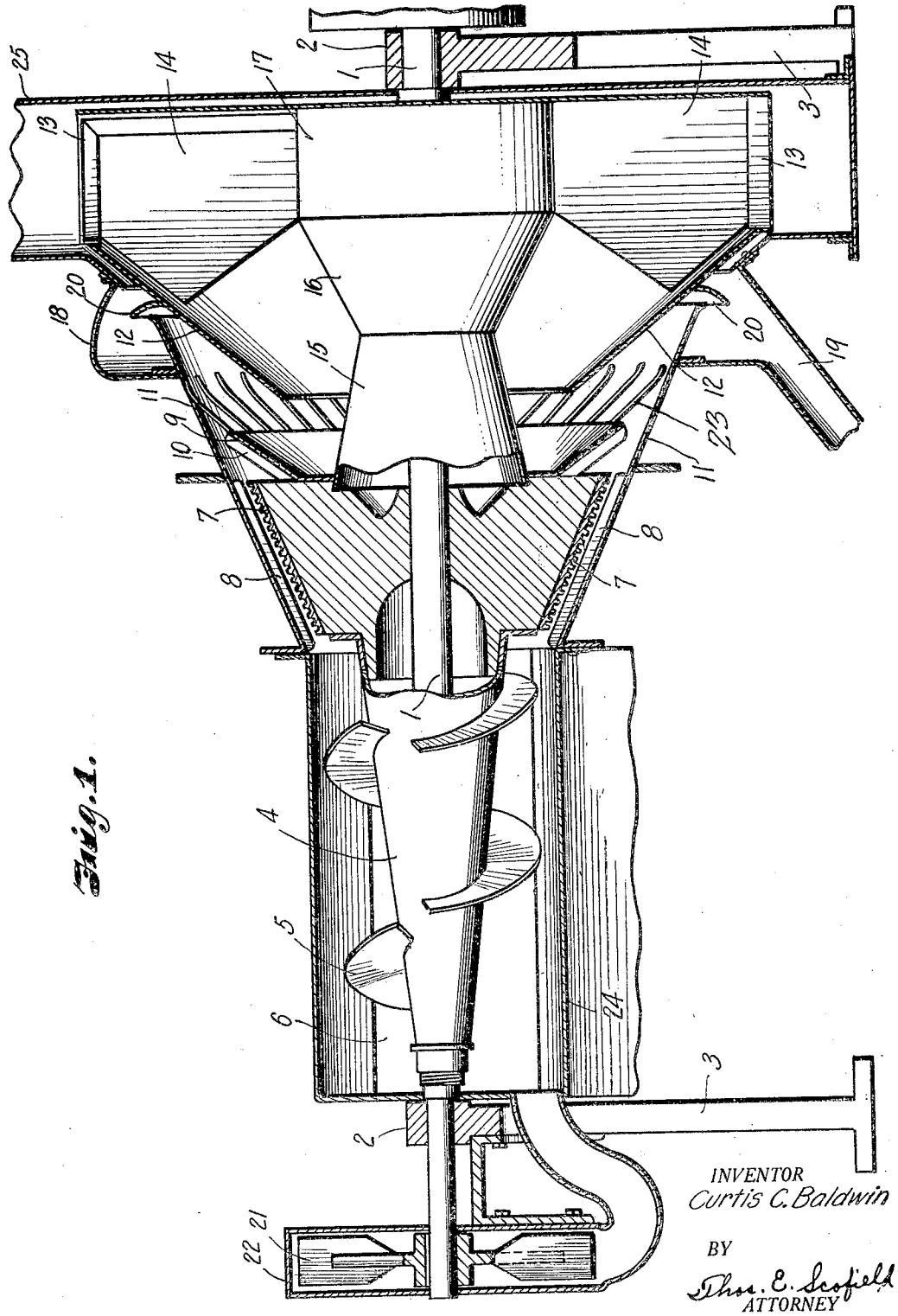

1,907,035

UNITED STATES PATENT OFFICE

CURTIS C. BALDWIN, OF WICHITA, KANSAS, ASSIGNOR TO CURTIS HARVESTERS, INC., OF NORTH KANSAS CITY, MISSOURI, A CORPORATION OF MISSOURI

CENTRIFUGAL THRESHING MACHINE

Application filed October 18, 1930. Serial No. 489,581.

This invention relates to improvements in a centrifugal threshing machine and refers more particularly to a machine in which a threshing cylinder and an exhaust fan for discharging the chaff and straw are mounted upon a single rotating shaft and enclosed in a housing whereby the crop to be threshed is continuously passed through the threshing cylinder and immediately thereafter the grain separated and discharged separately from the chaff and straw.

The novelty in the invention lies particularly in the auxiliary fan used to inject air into the charging portion of the machine and a plurality of wires or fingers positioned adjacent the discharge from the threshing cylinder, which wires are adapted to lift or raise the lighter straw and coarser materials away from the inside surface of the conical housing, permitting the passage of the heavier grain there beneath, the heavier grain clinging to the housing due to centrifugal force imparted thereto by the cylinder.

The single figure is a view taken partly in section to show the interior mechanism of the machine.

Referring to the drawing, a shaft 1 is mounted upon bearings 2 which are supported on suitable standard members 3. These standards may be mounted upon a portable foundation or on the frame of a combine harvester. It is contemplated that the machine may be used as a stationary threshing machine, or as a threshing unit on a combine harvester. On the shaft 1 is mounted a conical feeding member 4 on the periphery of which are arranged spiral veins 5, which serve to advance the crop from the charging opening 6 to the threshing cylinder 7. Surrounding the threshing cylinder is a concave 8. The threshing cylinder is preferably of the rasp type and is in the shape of a truncated cone. Adjacent the discharge end of the threshing cylinder is arranged a cone 9 which carries veins or blades 10 which serve to impart high velocity to the crop as it is discharged from the threshing cylinder.

On being discharged from the blades 10, the grain, mixed with the chaff and straw, traveling at high velocity, advances along the inner surface of the housing 11 which surrounds the threshing cylinder and the cone 9 at this point. A second cone 12 is positioned inside the housing 11. The smaller open end of this cone extends inside of the conical housing 11 and is positioned only a short distance beyond the rotating cone 9. The cone 12 is affixed to and rotates with the fan frame 13. The fan frame carries the blades 14, all of which rotate with the shaft 1. Within the cone 12 are two baffle cones 15 and 16, which rotate with the shaft and are attached to a hub 17 of the fan. These baffles serve to direct the chaff and straw discharged at high velocity from the cone 9 on to the fan blades 14. The grain which constitutes the heavier portion of the threshed material, due to the centrifugal force imparted thereto by the threshing cylinder and blades 10 on the cone 9, clings to the inside surface of the conical housing 11 and is discharged into a circular duct 18 and thence into an outlet spout 19.

Fastened to the cone 12 and extending into the duct 18 is a deflector 20 which is formed to receive the grain and direct it into the duct from which it is discharged through the spout 19.

On the shaft 1 is also mounted an auxiliary fan 21, positioned in a fan housing 22. The discharge from the fan 21 connects with the housing or casing 24, which encloses the charging cone 4. The function of the fan 21 is to facilitate and assist the veins 5 in charging the grain to the threshing cylinder 7. It also bulks and loosens the grain and provides a more uniform feed besides increasing the velocity of the speed of the crop which is introduced to the threshing cylinder.

In operation the crop is introduced through the inlet port 6 and is supplied by means of the veins 5 and fan 21 to the threshing cylinder where it passes between the frame of the cylinder and the concave 8. This concave may be made adjustable to accommodate different conditions of the grain or grains of different types. After being threshed, the mixture of grain, chaff and straw is discharged on to the rotating cone 9 and projected by the veins 10 at high velocity against the interior surface of the cone shaped housing 11. Inside of the housing and near the point where the materials are discharged on to the inner surface of the housing from the cone 9 are positioned a plurality of wires or fingers 23, one end of which are fastened to the housing and the other free ends raised above the housing to lift the coarser material, including the chaff and straw, from the surface of the housing so as to permit the heavier grain kernels to pass beneath. It will be noted that these prongs are canted from the radial lines of the conical housing 11 to which they are secured. The free ends, that is the ends of the wires 23 which are raised from the housing 11, point inwardly of the housing at the fan end of the machine. The longer portions are secured flat to the housing in canted positions by welding, brazing, riveting, machine screws, or in any suitable manner. These wires also serve to direct the coarser material into the air stream produced by the fan 14 and oppose the centrifugal action imparted to the materials. This coarser material is picked up by the air current produced by the fan and passes around the inner end of the rotating cone 12, thence on to the fan blades and finally passes out through the discharge opening of the fan designated as 25. The heavier grain kernels are moved along the interior surface of the housing and continue to cling to the cone 11 until they are discharged on to the baffle 20, which directs them into the duct 18 and finally through the spout 19 to any suitable storage, not shown.

I claim as my invention:

1. A centrifugal threshing machine comprising in combination a housing, a shaft mounted for rotation within said housing, coacting threshing elements mounted on said shaft and said housing respectively, a centrifuge impeller disk mounted adjacent said threshing elements for rotation with said shaft, said disk being adapted to impart centrifugal momentum to the threshed mass, an annular grain collecting duct forming part of said housing, a suction fan mounted on said shaft adapted to create an air stream of sufficient velocity to overcome the momentum of the chaff while insufficient to affect the grain, a plurality of spaced means positioned on said housing between said disk and said fan adapted to assist the chaff into said air stream and an outlet duct for the chaff.

2. A centrifugal threshing machine comprising in combination, a housing, a shaft mounted for rotation within said housing, coacting threshing elements mounted on said shaft and said housing respectively, a centrifugal impeller disk mounted on said shaft adjacent said threshing elements for rotation with the shaft, said disk adapted to impart centrifugal momentum to the threshed mass, an annular baffle plate within said housing disposed in proximity to said impeller disk and adapted to form a circuitous passageway therewith, and a suction fan adapted to create an air stream of sufficient velocity to overcome the momentum of the chaff to draw it through said passageway while of insufficient velocity to affect the grain, said housing having respective grain and chaff discharge openings.

3. A threshing machine as in claim 2 in which said housing is provided with a plurality of spaced means affixed thereto for assisting the separation of the chaff from the grain.

4. A threshing machine as in claim 1 having in combination a crop feeding means for delivering the crop to said threshing means.

5. A threshing machine as in claim 1 having in combination a crop feeding means for delivering the crop to said threshing means, and a fan mounted on said shaft for creating an auxiliary air blast to assist said feeding means.

In testimony whereof I affix my signature.

CURTIS C. BALDWIN.